US012694850B2

(12) United States Patent
Mu et al.

(10) Patent No.: US 12,694,850 B2
(45) Date of Patent: Jul. 28, 2026

(54) METHOD FOR PROCESSING DISPLAY DATA, ELECTRONIC DEVICE, AND DISPLAY PROCESSOR UNIT

(71) Applicants: VERISILICON MICROELECTRONICS (CHENGDU) CO., LTD., Chengdu (CN); VERISILICON MICROELECTRONICS (SHANGHAI) CO., LTD., Shanghai (CN)

(72) Inventors: Jiebin Mu, Chengdu (CN); Xinghong He, Chengdu (CN); Jia Li, Chengdu (CN); Ting Ye, Chengdu (CN); Huiming Zhang, Chengdu (CN)

(73) Assignees: VERISILICON MICROELECTRONICS (CHENGDU) CO., LTD., Sichuan (CN); VERISILICON MICROELECTRONICS (SHANGHAI) CO., LTD., Shanghai (CN)

( * ) Notice: Subject to any disclaimer, the term of this patent is extended or adjusted under 35 U.S.C. 154(b) by 270 days.

(21) Appl. No.: 18/570,697

(22) PCT Filed: Sep. 22, 2023

(86) PCT No.: PCT/CN2023/120706
§ 371 (c)(1),
(2) Date: Dec. 15, 2023

(87) PCT Pub. No.: WO2025/060064
PCT Pub. Date: Mar. 27, 2025

(65) Prior Publication Data
US 2025/0232497 A1     Jul. 17, 2025

(51) Int. Cl.
G06T 11/60     (2026.01)
G06F 3/14     (2006.01)
G06T 1/20     (2006.01)

(52) U.S. Cl.
CPC ................ G06T 11/60 (2013.01); G06F 3/14 (2013.01); G06T 1/20 (2013.01)

(58) Field of Classification Search
CPC ...................................................... G06F 3/14
See application file for complete search history.

(56) References Cited

U.S. PATENT DOCUMENTS 6,466,210 B1 * 10/2002 Carlsen ................. G06T 15/503
                                                         345/641
2009/0185721 A1     7/2009 Hiraga et al.
(Continued)

FOREIGN PATENT DOCUMENTS

CN     106408547 A     2/2017
CN     109448077 A     3/2019
(Continued)

OTHER PUBLICATIONS

Office Action with regard to the counterpart JP patent application No. 2024-555017 mailed Nov. 13, 2025.
(Continued)

*Primary Examiner* — Kee M Tung
*Assistant Examiner* — Khoa Vu
(74) *Attorney, Agent, or Firm* — BCF LLP

(57) ABSTRACT

The present disclosure provides a method for processing display data, electronic device, and display processor unit. The method comprises obtaining a pixel coordinate of a target pixel point; searching for a to-be-blended source layer among multiple source layers, wherein the to-be-blended source layer comprises pixels to be displayed on the display axis, and the display axis is the coordinate axis of the pixel (Continued)

coordinate in the pixel coordinate system; assigning the to-be-blended source layer to different blend cores, wherein the to-be-blended source layer corresponds one-to-one with the blend core; and each blend core blending the assigned to-be-blended source layer to generate display data. The method allows the blending of multiple layers with a small number of blend cores, reducing the demand for the number of blend cores and minimizing the area of the blender.

18 Claims, 4 Drawing Sheets

(56) References Cited

U.S. PATENT DOCUMENTS

| | | | | |
|---|---|---|---|---|
| 2018/0018936 | A1 | 1/2018 | Staudenmaier et al. | |
| 2018/0197507 | A1* | 7/2018 | Fink | G09G 5/377 |
| 2019/0043248 | A1* | 2/2019 | Trandafir | G06T 11/40 |
| 2022/0139352 | A1* | 5/2022 | Hu | G06T 11/60 |
| | | | | 345/204 |
| 2023/0041733 | A1* | 2/2023 | Glen | G06T 11/001 |

FOREIGN PATENT DOCUMENTS

| | | | |
|---|---|---|---|
| CN | 110377263 | A | 10/2019 |
| CN | 112907496 | A | 6/2021 |
| JP | 2003225427 | A | 8/2003 |
| JP | 2006317636 | A | 11/2006 |
| JP | 2007041225 | A | 2/2007 |
| JP | 2011232467 | A | 11/2011 |
| WO | 2022170621 | A1 | 8/2022 |

OTHER PUBLICATIONS

International Search Report and Written Opinion with regard to PCTCN2023120706 mailed May 18, 2024.
European Search Report with regard to EP patent application No. 23892751.1 mailed Feb. 3, 2025.

* cited by examiner

METHOD FOR PROCESSING DISPLAY DATA, ELECTRONIC DEVICE, AND DISPLAY PROCESSOR UNIT

The present disclosure is a National Stage of International Application No. PCT/CN2023/120706 filed on Sep. 22, 2023, entitled "METHOD FOR PROCESSING DISPLAY DATA, ELECTRONIC DEVICE, AND DISPLAY PROCESSOR UNIT".

TECHNICAL FIELD

The present disclosure relates to the field of image display technology, in particular to a method for processing display data, electronic device, and display processor unit.

BACKGROUND ART

The function of the DPU (Display Processor Unit) is to output image content to the display device. With the increasing development of large-scale integrated circuits, network technology, and display screen technology, the requirements for dynamic range, frame rate, and resolution of images are increasingly high. Therefore, the DPU is increasingly being emphasized within the industry.

The DPU can blend (merge or mix) multiple layers into a complete picture for display through a blender. The blender comprises multiple blend cores. Each blend core blends two layers according to the relationship of blend hierarchy configured by the software, then blends the result with a third layer, and so on, until the last layer is completely blended.

With the increasing demand, the number of layers that need to be displayed on a single screen is also growing. Correspondingly, the blender comprises more and more blend cores, and each blend core requires a series of multiplication and addition operations, thereby occupying a certain area. The more blend cores there are, the larger the area of the blender becomes. Therefore, the overall area of the blender increases with the increasing number of layers, which presents a significant challenge for the implementation area of the blender.

SUMMARY

The objective of the embodiments of the present disclosure is to provide a method for processing display data, electronic device, and display processor unit, for reducing the number of blend cores required and reducing the area of the blender.

In the first aspect, in one embodiment, the present disclosure provides a method for processing display data. The method is applied to a display processor unit, and the display processor unit comprises multiple blend cores. The method comprises the following steps: obtaining a pixel coordinate of a target pixel point; searching for a to-be-blended source layer among multiple source layers, wherein the to-be-blended source layer comprises pixels to be displayed on a display axis, and the display axis is the coordinate axis of the pixel coordinate in the pixel coordinate system; assigning the to-be-blended source layer to different blend cores, wherein the to-be-blended source layer corresponds one-to-one with the blend core; and each blend core performs blending the assigned to-be-blended source layer to generate display data.

The above method for processing display data filters out the to-be-blended source layer from the source layers for participation in the blending of the target pixel point. It assigns a blend core to the to-be-blended source layer for blending, without the need to pre-allocate a blend core for each source layer. The method allows the blending of multiple layers with a small number of blend cores, reducing the demand for the number of blend cores and minimizing the area of the blender.

In optional embodiments, the display processor unit also comprises multiple layer selectors, wherein each layer selector corresponds one-to-one with one blend core. The source layers are provided with a predefined first number. The step of searching for a to-be-blended source layer among multiple source layers comprises that: each of the layer selectors obtains the source layers one by one according to the order of the first number, and determines whether the obtained source layer is the to-be-blended source layer; each of the layer selectors renumbers the to-be-blended source layer based on the order of acquisition of the to-be-blended source layer, and a second number is generated; and each layer selector searches for an assigned source layer of the layer selector, wherein the assigned source layer is the to-be-blended source layer whose second number is the same as the blend core number corresponding to the layer selector, and the assigned source layer is used to be assigned to the blend core corresponding to each layer selector.

In the aforementioned embodiment, retaining the original hierarchy of the to-be-blended source layer and renumbering the to-be-blended source layer, a second number is generated. The second number and the hierarchy of the blend core correspond one-to-one. Thus, when using the second number to allocate the to-be-blended source layer, the blend core can obtain the to-be-blended source layer corresponding to its hierarchy. Based on the hierarchical relationship of the blend cores, source layers can be blended according to the original hierarchy, without the need to change the hardware structure.

In optional embodiments, the display processor unit also comprises multiple layer selectors, wherein each layer selector corresponds one-to-one with one blend core. The source layers are provided with a predefined first number. The step of searching for a to-be-blended source layer among multiple source layers comprises: performing an iteration by each layer selector, wherein the iteration comprises: obtaining a source layer of the first number identical to a first parameter, and determining whether the obtained source layer is the to-be-blended source layer, wherein an initial value of the first parameter is zero; incrementing, if the obtained source layer is the to-be-blended source layer, the second parameter by one, wherein an initial value of the second parameter is negative one; determining if the second parameter incremented by one is identical to the number of the blend core; if they are identical, taking the second parameter incremented by one as the second number of the obtained source layer and stopping the iteration, wherein the obtained source layer is the assigned source layer for that layer selector, and the assigned source layer is used for allocation to the blend core corresponding to each layer selector; if they are not identical, incrementing the first parameter by one and conducting a new round of iteration.

In the aforementioned embodiment, retaining the original hierarchy of the to-be-blended source layer and renumbering the to-be-blended source layer, a second number is generated. The second number and the hierarchy of the blend core correspond one-to-one. Thus, when using the second number to allocate the to-be-blended source layer, the blend core can obtain the to-be-blended source layer corresponding to its hierarchy. Based on the hierarchical relationship of the blend cores, source layers can be blended according to the original hierarchy, without the need to change the hardware structure.

In optional embodiments, the method further comprises incrementing, if the obtained source layer is not the to-be-blended source layer, the current first parameter by one and performing a new round of iteration.

In optional embodiments, the method further comprises determining whether the current first parameter is greater than a maximum value of the first number; if the current first parameter is greater than the maximum value of the first number, terminating the iteration.

In the above embodiment, when the first parameter is greater than the maximum value of the first number, the iteration is quickly terminated, which helps save execution time and reduce computational resources.

In optional embodiments, the number of the blend cores represents the hierarchy of the blend cores. The step of each blend core performs blending the assigned to-be-blended source layer to generate display data comprises blending, through a top-level blend core, the assigned to-be-blended source layer with predefined background color; blending, through other blend cores, the assigned to-be-blended source layer with blending data output by the blend core of the previous level, wherein the other blend cores are any blend core except the top-level blend core, and the display data are the blending data output by the blend core of the last level.

In the above embodiment, blending the top-level to-be-blended source layers with the background color takes into consideration the effect of the background color on the display data, thereby ensuring that the generated display data aligns more closely with user expectations.

In the second aspect, in one embodiment, the present disclosure provides a display processor unit, wherein the display processor unit comprises multiple layer selectors and multiple blend cores. The multiple blend cores are configured for: obtaining a pixel coordinate of a target pixel point; searching for a to-be-blended source layer among multiple source layers, wherein the to-be-blended source layer comprises pixels to be displayed on a display axis, and the display axis is the coordinate axis of the pixel coordinate in the pixel coordinate system; assigning the to-be-blended source layer to different blend cores, wherein the to-be-blended source layer corresponds one-to-one with the blend core; and each blend core is configured for blending the assigned to-be-blended source layer to generate display data.

In optional embodiments, each layer selector corresponds one-to-one with one blend core. The source layers are provided with a predefined first number. Each of the layer selectors is used for: obtaining the source layers one by one in the order of the first number and determining if the obtained source layer is the to-be-blended source layer, renumbering the to-be-blended source layer based on the order of acquisition of the to-be-blended source layer, and then generating a second number; and searching for an assigned source layer of the layer selector, wherein the assigned source layer is the to-be-blended source layer whose second number is the same as the blend core number corresponding to the layer selector, and the assigned source layer is used to be assigned to the blend core corresponding to each layer selector.

In optional embodiments, each layer selector corresponds one-to-one with one blend core. The source layers are provided with a predefined first number. Each layer selector is used for performing an iteration, wherein the iteration comprises: obtaining a source layer of the first number identical to a first parameter, and determining whether the obtained source layer is the to-be-blended source layer, wherein an initial value of the first parameter is zero; incrementing, if the obtained source layer is the to-be-blended source layer, the second parameter by one, wherein an initial value of the second parameter is negative one; determining if the second parameter incremented by one is identical to the number of the blend core; if they are identical, taking the second parameter incremented by one as the second number of the obtained source layer and stopping the iteration, wherein the obtained source layer is the assigned source layer for that layer selector, and the assigned source layer is used for allocation to the blend core corresponding to each layer selector; if they are not identical, incrementing the first parameter by one and conducting a new round of iteration.

In optional embodiments, the iteration further comprises incrementing, if the obtained source layer is not the to-be-blended source layer, the current first parameter by one and performing a new round of iteration.

In optional embodiments, the iteration further comprises determining whether the current first parameter is greater than a maximum value of the first number; if the current first parameter is greater than the maximum value of the first number, terminating the iteration.

In optional embodiments, the number of the blend cores represents the hierarchy of the blend cores. A top-level blend core is used for blending the assigned to-be-blended source layer with a predefined background color. Other blend cores are used for blending the assigned to-be-blended source layer with blending data output by the blend core of the previous level, wherein the other blend cores are any blend core except the top-level blend core, and the display data are the blending data output by the blend core of the last level.

In the third aspect, in one embodiment, the present disclosure provides an electronic device, comprising a display processor unit as described in any one of the second aspects.

In the embodiments of the present disclosure, the process of filtering the to-be-blended source layers from the source layers for participation in the blending of the target pixel point, and assigning the blend cores to the to-be-blended source layers, eliminates the need to pre-assign a blend core for each source layer. The method allows achieving the blending of multiple layers with a small number of blend cores, thus improving the utilization of the blend cores and enhancing the operating efficiency of the blender. Furthermore, by reducing the requirement for the number of blend cores while still achieving the blending of multiple layers with a few blend cores, it is possible to reduce the number of blend cores and reduce the area of the blender during the design of the blender.

DETAILED DESCRIPTION OF EMBODIMENTS

Not all the layers displayed on the screen need to be blended together through the blender. Different source layers comprise varying display regions on the screen. Therefore, the maximum number M of source layers that are blended at a specific pixel point, i.e., the maximum blend thickness M, is often less than the total number of source layers N, i.e., $M<=N$.

According to that, the present disclosure provides a method for processing display data, which filters out the to-be-blended source layer from the source layers for participation in the blending of the target pixel point. It assigns a blend core to the to-be-blended source layer for blending, without the need to pre-allocate a blend core for each source layer. The method allows the blending of multiple layers with a small number of blend cores, reducing the demand for the number of blend cores and minimizing the area of the blender.

Figure 1:
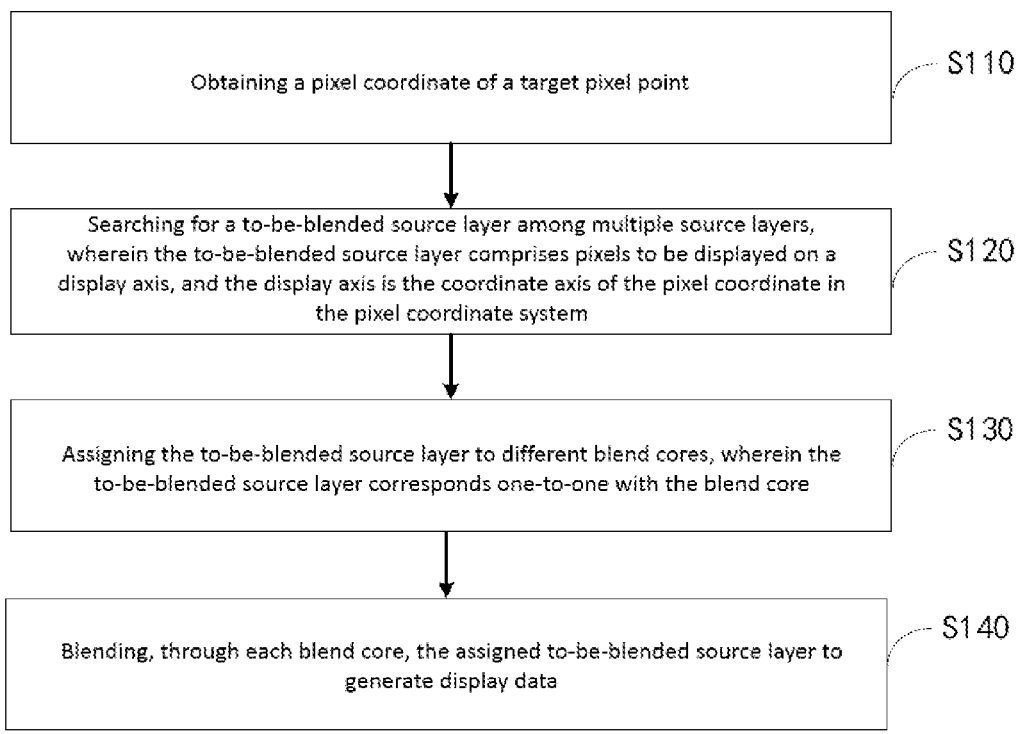
FIG. 1 is a flowchart of a method for processing display data provided in one embodiment of the present disclosure.

FIG. 1 shows a method for processing display data provided by an embodiment of the present disclosure. The method is applied to a display processor unit, and the display processor unit comprises multiple blend cores. As shown in FIG. 1, the method comprises steps 110 to 140.

Step 110: obtaining a pixel coordinate of a target pixel point.

A target pixel point refers to a pixel that is ready for blending. For example, a blended image is composed of multiple source layers, and a target pixel point can be one pixel point at any position on the blended image.

Obtaining the coordinates of the target pixel point under the pixel coordinate system is pixel coordinates. The pixel coordinate system can be set according to needs. For example, the coordinate system of the blended image is used as the pixel coordinate system. For instance, the bottom-left corner of the blended image is set as the origin, the width of the blended image is set as the X-axis, and the height of the blended image is set as the Y-axis, thus creating the pixel coordinate system. The coordinates of the target pixel point, for example, (1,1).

Step 120: searching for a to-be-blended source layer among multiple source layers, wherein the to-be-blended source layer comprises pixels to be displayed on a display axis, and the display axis is the coordinate axis of the pixel coordinate in the pixel coordinate system.

The source layers refer to images used for blending.

In the step of searching for a to-be-blended source layer among multiple source layers, the to-be-blended source layer refers to the source layer that comprises pixels to be displayed on a display axis. The display axis is the coordinate axis in the display coordinate system corresponding to the X coordinate or Y coordinate of the display coordinates. For instance, in the embodiment of the blended image, it is assumed that all source layers used for the blended image comprise source layer 0, source layer 1, and source layer 2. After obtaining the display coordinates (1,1) of the target pixel point, the display axis of the current target pixel point is obtained. The display axis refers to the coordinate axis in the pixel coordinate system, i.e., the X=1 axis and the Y=1 axis. It is possible to select any coordinate axis as the display axis according to requirements. For example, choosing rows as the display axis, the 1st row (X=1) is referred to as the display axis. In the aforementioned source layers 0 to 3, for each source layer, whether it comprises pixels to be displayed on the display axis (X=1) is determined. If a source layer comprises pixel points to be displayed on the display axis, it indicates that it is able to participate in the blending of the target pixel point and is selected as the to-be-blended source layer.

Figure 2:
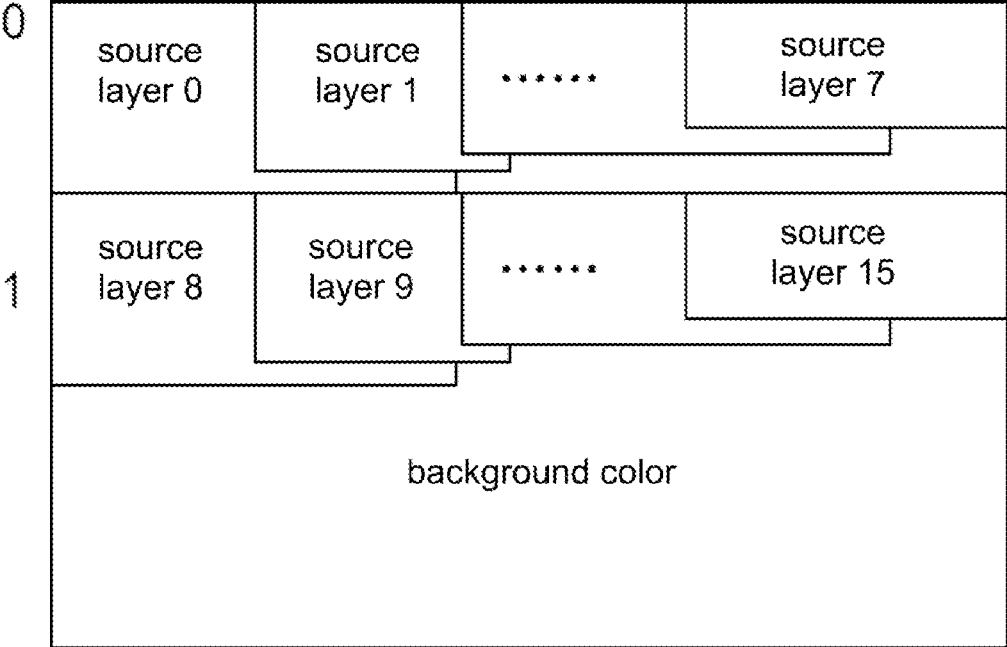
FIG. 2 is a hierarchy diagram of source layers provided in one embodiment of the present disclosure.

In another example of the present disclosure, as shown in FIG. 2, FIG. 2 presents the hierarchy diagram of source layers according to the embodiment of the present disclosure. In FIG. 2, there are a total of 16 source layers, meaning the blend hierarchy for each source layer ranges from 0 to 15. In FIG. 2, the 0th row comprises source layers 0 to 7, while the remaining source layers 8 to 15 are distributed in the 1st row. So, when the target pixel is in the 0th row, source layers 0 to 7 are all to-be-blended layers. When the target pixel is in the 1st row, source layers 8 to 15 are all to-be-blended layers.

In another embodiment of the present disclosure, the target pixel point refers to a pixel to be blended on the display. The coordinate system of the display is used as the pixel coordinate system to obtain the pixel coordinates of the target pixel point. Suppose each source layer can represent a layer where a display window is located. Blending the source layers with each other will result in the display image of the display. Due to the potential differences in the display regions of the source layers, for example, source layer A may contain a window located in the lower-left corner of the display, source layer B may contain a window in the central part of the display, and source layer C may contain a window displayed across the entire screen. Describing the positions of all source layers using the pixel coordinate system, it can be observed that only the bottom-left corner of source layer A comprises pixels that need to be blended before display, and only the central part of source layer B comprises pixels that require blending before display, and only source layer C comprises display pixels in all positions that need blending before display. Assuming the coordinates of the target pixel point are (0,0) and the optional axes for the pixel comprise the row where the 0 coordinate is located and the column where the 0 coordinate is located, anyone can be chosen. If choosing the row where the 0 coordinate is located, i.e., the 0th row, as the display axis, then the searching can be performed among the source layers: if any source layer comprises pixel points to be displayed on the 0th row, it means that this source layer is a to-be-blended source layer. Among the mentioned source layers A to C, only source layer A and source layer C can be selected as to-be-blended source layers.

Step 130: assigning the to-be-blended source layer to different blend cores, wherein the to-be-blended source layer corresponds one-to-one with the blend core.

A to-be-blended source layer is assigned to a blend core within the display processor unit. Different to-be-blended source layers are assigned to different blend cores, and one single blend core can only be assigned to one to-be-blended source layer. For example, to-be-blended source layer A is assigned to blend core 0, and to-be-blended source layer C is assigned to blend core 1.

In the embodiment of the present disclosure, the display processor unit also comprises multiple layer selectors, wherein each layer selector corresponds one-to-one with one blend core. The source layers are provided with a predefined first number. The above step 120 can be accomplished by steps: each of the layer selectors obtains the source layers one by one according to the order of the first number, and determines whether the obtained source layer is the to-be-blended source layer; each of the layer selectors renumbers the to-be-blended source layer based on the order of acquisition of the to-be-blended source layer, and a second number is generated; and each layer selector searches for an assigned source layer of the layer selector, wherein the assigned source layer is the to-be-blended source layer whose second number is the same as the blend core number corresponding to the layer selector, and the assigned source layer is used to be assigned to the blend core corresponding to each layer selector.

Figure 3:
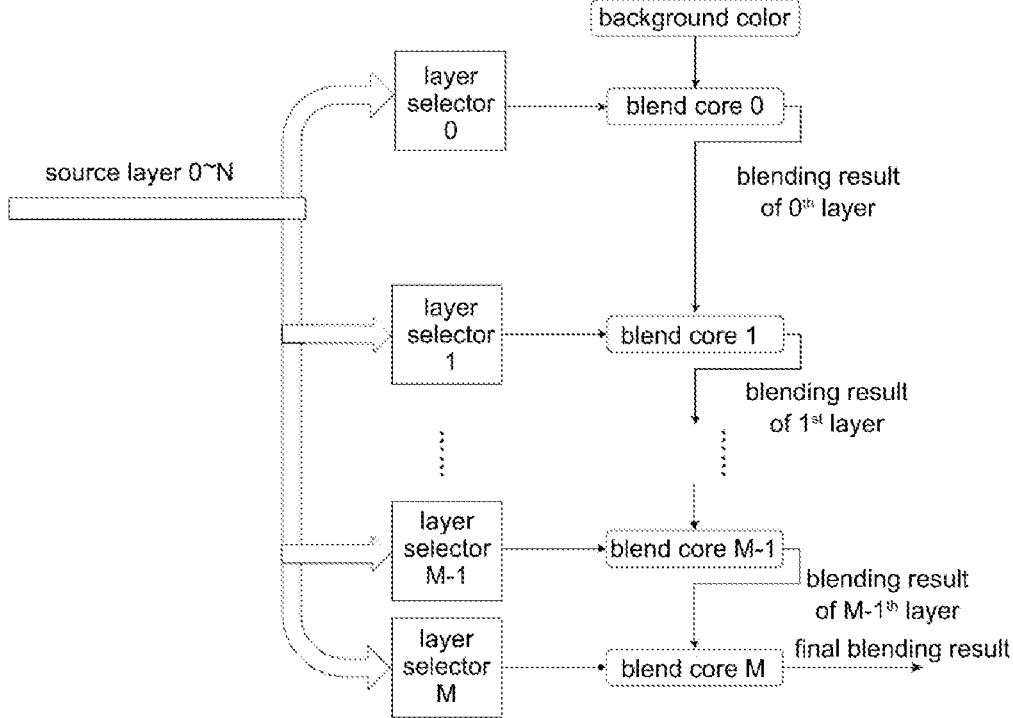
FIG. 3 is a structural diagram of the blender in the display processor unit provided in one embodiment of the present disclosure.

The display processor unit also comprises multiple layer selectors, and there is a corresponding relationship between the layer selectors and the blend cores. As shown in FIG. 3, FIG. 3 shows the structural diagram of a blender in a display processor unit. The blender is provided with a total of M blend cores, with each blend core performing one layer of blending. Each blend core corresponds with a layer selector. In FIG. 3, there are a total of N source layers, and the blend hierarchy of each source layer is distinct from each other. Therefore, the range of the blend hierarchy for each source layer is from 0 to N−1. Each layer selector can operate in parallel.

The hierarchy of a source layer is the first number of the source layer. Each layer selector will sequentially obtain source layers in ascending order of the first number. For each obtained source layer, whether it is a to-be-blended layer for the target pixel is determined, thereby obtaining the to-be-blended source layers of the source layer. For example, in the embodiment shown in FIG. 3, layer selector 0 will start from source layer 0 and sequentially obtain source layers until source layer N−1. For each obtained source layer, it evaluates whether it is a to-be-blended layer for the target pixel.

For all the to-be-blended source layers, they are numbered in the order in which they were acquired. For example, in the case of the N source layers in FIG. 3, the source layers of 0th, 2nd, 4th, 6th, and 8th are assumed as to-be-blended source layers. Based on the order from 0 to N−1, in these to-be-blended source layers, source layer 0 is the first to be obtained, source layer 2 is the second to be obtained, source layer 4 is the third to be obtained, source layer 6 is the fourth to be obtained, and source layer 8 is the fifth to be obtained. Layer selector 0, following this sequence, renumbers the aforementioned source layers of 0th, 2nd, 4th, 6th, 8th to 0, 1, 2, 3, 4, thus generating the second number. Thus, the selected to-be-blended source layers are renumbered in ascending order of blend hierarchy, for setting a reordered blend hierarchy.

It is important to note that the second number needs to be the same as the number of the blend core, making it convenient to correlate each to-be-blended source layer based on the second number. For example, if the numbers of the blend cores are from 0001 to 0004, then the renumbered second numbers generated from reordering the to-be-blended source layers will also be from 0001 to 0004.

Each layer selector, within the to-be-allocated source layers it has found, searches for the to-be-blended source layer configured for assigning a corresponding blend core to the layer selector, i.e., the assigned source layer. The second number of the assigned source layer is identical to the number of the blend core corresponding to the layer selector. For example, layer selector 0 corresponds to blend core 0, and the number of the blend core 0 is 0. So, layer selector 0, within the to-be-allocated source layers it has found, searches for a source layer with a second number of 0. As a result, each layer selector selects source layers from all source layers that are in the same row and the same layer as the target pixel of the blend core.

Correspondingly, after searching the assigned source layer through the above steps, each layer selector assigns the assigned source layer to its corresponding blend core. In the aforementioned embodiment, retaining the original hierarchy of the to-be-blended source layer and renumbering the to-be-blended source layer, a second number is generated. The second number and the hierarchy of the blend core correspond one-to-one. Thus, when using the second number to allocate the to-be-blended source layer, the blend core can obtain the to-be-blended source layer corresponding to its hierarchy. Based on the hierarchical relationship of the blend cores, source layers can be blended according to the original hierarchy, without the need to change the hardware structure.

In the embodiment of the present disclosure, the display processor unit also comprises multiple layer selectors, wherein each layer selector corresponds one-to-one with one blend core. The source layers are provided with a predefined first number. The step of searching for a to-be-blended source layer among multiple source layers comprises: performing an iteration by each layer selector, wherein the iteration comprises: obtaining a source layer of the first number identical to a first parameter, and determining whether the obtained source layer is the to-be-blended source layer, wherein an initial value of the first parameter is zero; incrementing, if the obtained source layer is the to-be-blended source layer, the second parameter by one, wherein an initial value of the second parameter is negative one; determining if the second parameter incremented by one is identical to the number of the blend core; if they are identical, taking the second parameter incremented by one as the second number of the obtained source layer and stopping the iteration, wherein the obtained source layer is the assigned source layer for that layer selector, and the assigned source layer is used for allocation to the blend core corresponding to each layer selector; if they are not identical, incrementing the first parameter by one and conducting a new round of iteration.

Figure 4:
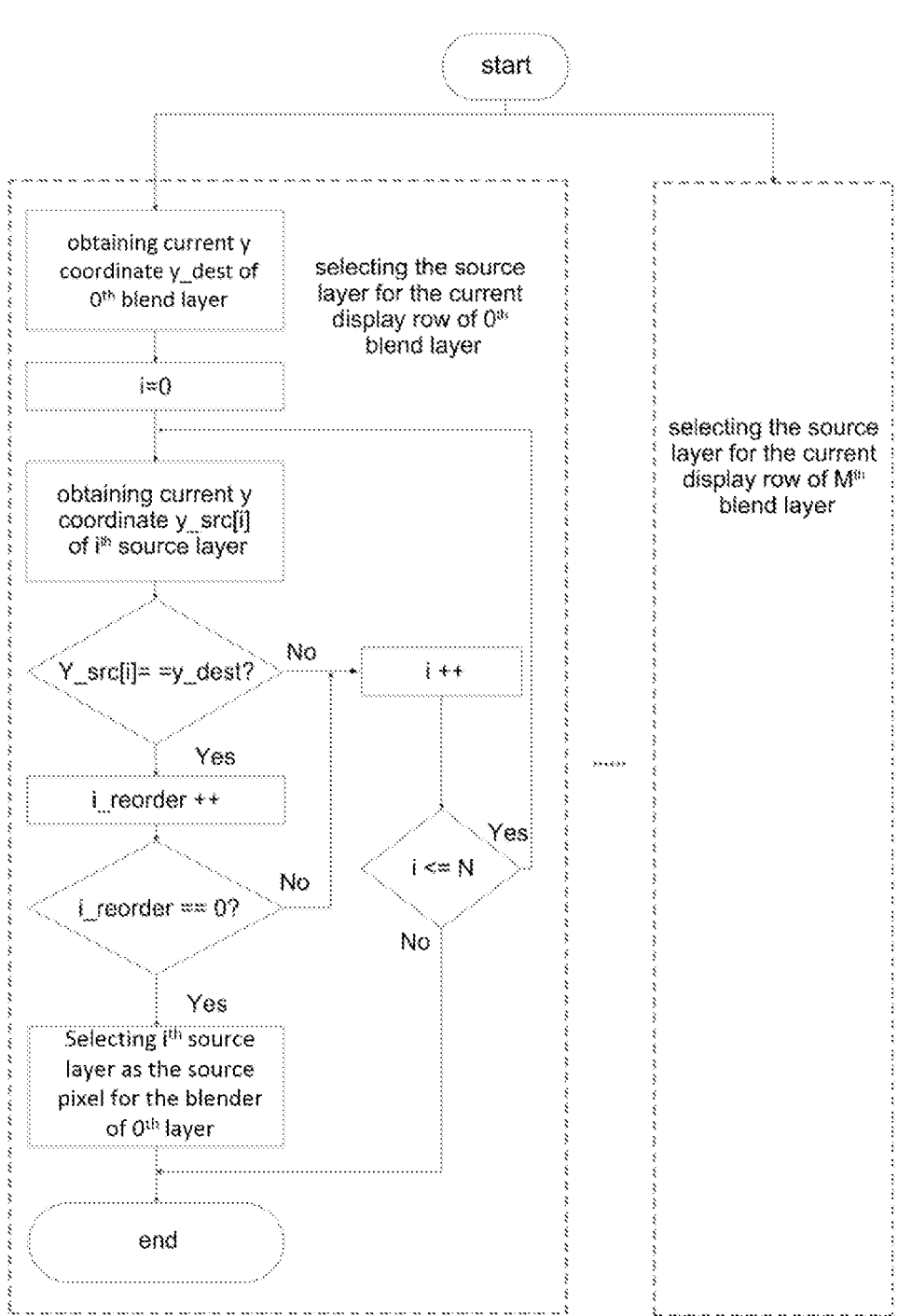
FIG. 4 is the flowchart of an iteration process provided in one embodiment of the present disclosure.

As shown in FIG. 4, FIG. 4 shows an iteration process in the embodiment of the present disclosure. In FIG. 4, each layer selector executes a selection process that comprises iteration steps in parallel. Through the selection process depicted in FIG. 4, each layer selector selects source layers for the current display row of its corresponding blend layer, wherein the blend layer refers to the layer that the blend core is going to generate. For example, the embodiment of FIG. 4 is executed in the scenario depicted in FIG. 2. In FIG. 2, there are a total of 16 source layers, where the range of blend hierarchy for each source layer is from 0 to 15. There are 8 blend cores in total, that is to say, the maximum blend thickness is 8. The hierarchy diagram of the input source layers is shown in FIG. 2. The 0th row in FIG. 2 comprises source layers 0 to 7, while the remaining source layers 8 to 15 are distributed in the 1st row.

In FIG. 4, the left side illustrates the selection process of layer selector 0.

In FIG. 4, layer selector 0 receives coordinate y_dest of the current display row Y of the 0th blend layer. y_dest is transmitted from the 0th blend core to layer selector 0, meaning that y_dest is the display axis of the target pixel. For instance, layer selector 0 obtains the coordinate in the blend layer where the target pixel is located and obtains the axis where its row coordinates are located to get the current display row. Assuming the coordinate of the target pixel is (0,0), the 0th blend core transmits the row number y_dest=0 of the target pixel to the layer selector 0 of the same layer.

The execution of iteration starts, including:
   obtaining the current i parameter (i parameter is the first parameter); obtaining the source layer of the same layer number as the value of the i parameter. In the first round of iteration, the initial value of i is 0, so layer selector 0 obtains the 0th source layer. i denotes a parameter for counting, which is used to record the layer number (i.e., the first number) of the read source layer. The initial value of i is 0. In one embodiment of the present disclosure, all source layers 0 to 15 in FIG. 2 transmit the row number y_src of the current pixel to layer selector 0. The values of y_src in each source layer in FIG. 2 are as follows: for each source layer from 0 to 7, the value of y_src of each source layer is 0; and for each source layer from 8 to 15, the value of y_src of each source layer is 1.

Layer selector 0, based on the current value of the i parameter, reads the source layer for the current round and reads the row number y_src[i] of the current pixel in the source layer. The row number y_src[i] of the current pixel represents the row in which the current pixel is located in the source layer. For example, in the first round of iteration, layer selector 0 reads the coordinate y_src[0] of the current pixel in the 0th source layer.

Whether y_src[i] is equal to y_dest is determined, and if they are equal, the obtained source layer is a to-be-blended source layer. For example, in the embodiment shown in FIG. 4, a predefined layer judgment program is executed, and the predefined layer judgment program in FIG. 4 is expressed in the form of programming operators: (y_src[i]==y_dest?). In the source layer 0 of FIG. 2, y_src[0]=0, and in the embodiment, y_dest=0, so y_src[0]=y_dest will be output, and the 0th layer source layer is a to-be-blended source layer.

If the obtained source layer is a to-be-blended source layer, the current value of i_reorder (i.e., the second parameter) is obtained, and 1 is added to it. i_reorder is a parameter used to record the second number of the to-be-blended source layer. The initial value of i_reorder is −1. In the embodiment shown in FIG. 4, a second parameter assignment program is executed, and the second parameter assignment program in FIG. 4 is expressed in the form of programming operators: (i_reorder++). In the previous steps, the 0th source layer is a to-be-blended source layer. Since in the first round of iteration, i_reorder=−1, then i_reorder+1=0.

The current i_reorder (i.e., i_reorder after +1) is determined to see whether it is equal to the hierarchy of the blend core. In the embodiment shown in FIG. 4, for layer selector 0, which corresponds to blend core 0, it needs to determine if i_reorder equals 0. In FIG. 4, the layer selector can execute a predefined second parameter judgment program, wherein the second parameter judgment program is expressed in the form of programming operators: (i_reorder==0?).

If the current i_reorder is equal to the hierarchy of the blending core, it means the currently obtained source layer is the to-be-blended source layer corresponding to the blend core. For the embodiment of FIG. 4, in the first round of iteration for layer selector 0, it determines if the current i_reorder equals 0, and if it equals 0, it means that the currently obtained source layer (the 0th source layer) is the to-be-blended source layer of the hierarchy corresponding to the blend core 0. The current i_reorder (i_reorder=0) is then used as the second number of the obtained source layer, that is to say, the obtained source layer (the 0th source layer) is the assigned source layer of layer selector 0. The assigned source layer is used to be assigned to blend core 0 corresponding to layer selector 0. The i-th source layer is selected as the source pixel of the blend core, and then the iteration is ended.

If the current i_reorder is not equal to 0, it means the currently obtained source layer is not the to-be-blended source layer corresponding to the blend core. In the embodiment shown in FIG. 4, in the first round of iteration for layer selector 1, the current i_reorder (i_reorder=0) is not equal to 1, it indicates that the currently obtained source layer (the 0th source layer) is not the to-be-blended source layer that corresponds to the hierarchy of blend core 1. The layer selector 1, upon determining that i_reorder is not equal to 1, can increment the parameter i by 1, so as to start a new round of iteration. In the embodiment of the present disclosure, the method also comprises incrementing, if the obtained source layer is not the to-be-blended source layer, the current first parameter by one and performing a new round of iteration.

As shown in FIG. 4, when it is determined that y_src[i] is not equal to y_dest, it indicates that the currently obtained source layer is not the to-be-blended layer of the target pixel point. Then a predefined first parameter assignment program is executed, wherein the first parameter assignment program is expressed in the form of programming operators: (i++). At this time, the parameter i is incremented by 1, thus starting a new iteration.

For each layer selector, after searching the to-be-blended source layer corresponding to the blend core through the iteration steps described above, the to-be-blended source layer is assigned to the blend core.

The above embodiments provide an implementation of a layer selector generating a second number of a to-be-blended source layer, wherein the second number retains the original hierarchy of the to-be-blended source layer. Thus, when using the second number to allocate the to-be-blended source layer, the blend core can obtain the to-be-blended source layer corresponding to its hierarchy. Based on the hierarchical relationship of the blend cores, source layers can be blended according to the original hierarchy, without the need to change the hardware structure.

In the embodiment of the present disclosure, the method also comprises determining whether the first parameter is greater than a maximum value of the first number; if the first parameter is greater than the maximum value of the first number, terminating the iteration.

As shown in FIG. 4, after incrementing the first parameter by one, it is determined whether the abort condition is satisfied or not, and the abort is expressed in the form of a programming operator: (i<=N), where the abort condition indicates that the current first parameter is less than or equal to the maximum value of the first number (the hierarchy of the source layer); if the abort condition is not satisfied, it means that the first parameter is greater than the maximum value of the first number, which indicates that the judgment of the to-be-blended source layer has been executed for all source layers, and the iteration can be ended directly. Conversely, if the first condition is satisfied, it means that the first parameter is less than or equal to the maximum value of the first number, and there exists a source layer that can perform the judgment of the to-be-blended source layer, so that the iteration should be continued.

In the above embodiment, when the first parameter is greater than the maximum value of the first number, the iteration is quickly terminated, which helps save execution time and reduce computational resources.

Based on the method in FIG. 4, the allocation of rows 0th to 1th of FIG. 2 to blend cores is shown in Table 1 below.

TABLE 1

| Assignment relationship between blend cores and source layers | | |
| --- | --- | --- |
| Blend core | 0th row | 1st row |
| 0 | source layer 0 | source layer 8 |
| 1 | source layer 1 | source layer 9 |
| 2 | source layer 2 | source layer 10 |
| 3 | source layer 3 | source layer 11 |
| 4 | source layer 4 | source layer 12 |
| 5 | source layer 5 | source layer 13 |
| 6 | source layer 6 | source layer 14 |
| 7 | source layer 7 | source layer 15 |

Step 140: blending, through each blend core, the assigned to-be-blended source layer to generate display data.

The layer selector sends the to-be-blended source layer that has the same hierarchy as the blend core to the blend core or the layer selector can obtain all pixels on the display axis in the to-be-blended source layer and send the obtained pixels to the blend core. For example, in FIG. 3, layer selector 0 selects the source layer, i.e., source layer 0, which is the same layer as blend core 0 according to i_reorder, and passes it to the blend core to participate in the blending as a source pixel.

Each blend core blends its assigned to-be-blended source layer, thereby generating the display data.

In the embodiment of the present disclosure, the number of the blend cores represents the hierarchy of the blend cores. The step of each blend core performs blending the assigned to-be-blended source layer to generate display data comprises blending, through a top-level blend core, the assigned to-be-blended source layer with predefined background color; blending, through other blend cores, the assigned to-be-blended source layer with blending data output by the blend core of the previous level, wherein the other blend cores are any blend core except the top-level blend core, and the display data are the blending data output by the blend core of the last level.

As shown in FIG. 3, the numbers 0 to M of the blend cores also indicate the hierarchy of each blend core. The blend core numbered 0 is the first level, and the blend core numbered 1 is the second level. The larger the blend core number, the lower the level, and therefore, the blend core numbered M is the lowest level. In FIG. 3, assuming that the source layers of 0th, 2nd, 4th, 6th, and 8th are renumbered as 0, 1, 2, 3, and 4, as shown in FIG. 3, a layer assigning to blend core 0 is the to-be-blended layer 0 (i.e., the source layer 0). The layer is the first layer of the to-be-blended layer, and thus blend core 0 will select the configured background color as the target pixel data. In to-be-blended layer 0, the pixel corresponding to the position of the target pixel is obtained as the source pixel, and the source pixel and the target pixel data are blended to obtain the blending data of blend core 0.

For each blend core except blend core 0, its target pixel data is the blending data output by the blend core of the previous level. For example, the layer assigned to blend core 1 is to-be-blended layer 1, wherein blend core 1 is not the first level and will not be assigned to the to-be-blended layer of the first level, and it is necessary to use the blending result of the previous layer as the target pixel data of the blend core of the current layer. In to-be-blended layer 1, the pixel corresponding to the position of the target pixel is obtained as the source pixel, and the source pixel and the target pixel data are blended to obtain the blending data of blend core 1.

Through the level-by-level blending of the blend core, the to-be-blended source layer will be blended layer by layer, so that the blending data output from the last layer of the blend core are the blending data of the target pixels.

In an example of the present disclosure, each blend core continues to blend all pixels in the row where the target pixel is located one by one. For example, any pixel in row 0th of FIG. 3 such as (0, 0) is selected as the target pixel, and the to-be-blended source layers 0 to 7 corresponding to row $0^{th}$ are selected out. The blend cores cooperate with each other to obtain the blending data of the target pixel using the to-be-blended source layers 0 to 7. The blend cores, along an extension direction of the row, will then obtain pixels one by one to blend. For example, blend core 0 obtains the pixel corresponding to the second pixel (0, 1) in the to-be-blended source layer 0 and blends it with the background color. The other blend cores also obtain the blended pixel of (0, 1), where the pixels corresponding to (0, 1) in the to-be-blended source layers 1 to 6 are blended with each other. The acquisition is repeated along the direction of the row. After completing the blending of all target pixels in the current row, the current row is blended again, by proceeding to the next row and performing the steps from 110 to 140 on the selected target pixels. After the blending is performed row by row, the blending result of the last layer of the blend core is output as the result of the whole blender.

In the above embodiment, blending the top-level to-be-blended source layers with the background color takes into consideration the effect of the background color on the display data, thereby ensuring that the generated display data aligns more closely with user expectations.

The described method for processing display data obtains, from the source layers, the to-be-blended source layer that is required for blending the current pixel point, and reassigns the blend cores for the to-be-blended source layers for blending, which does not require pre-allocating blend cores for each source layer. The present disclosure assigns the blend core merely according to the number of source layers required by pixel points, which reduces the number of blend cores and solves the disadvantage of an excessive area of the blender.

Figure 5:
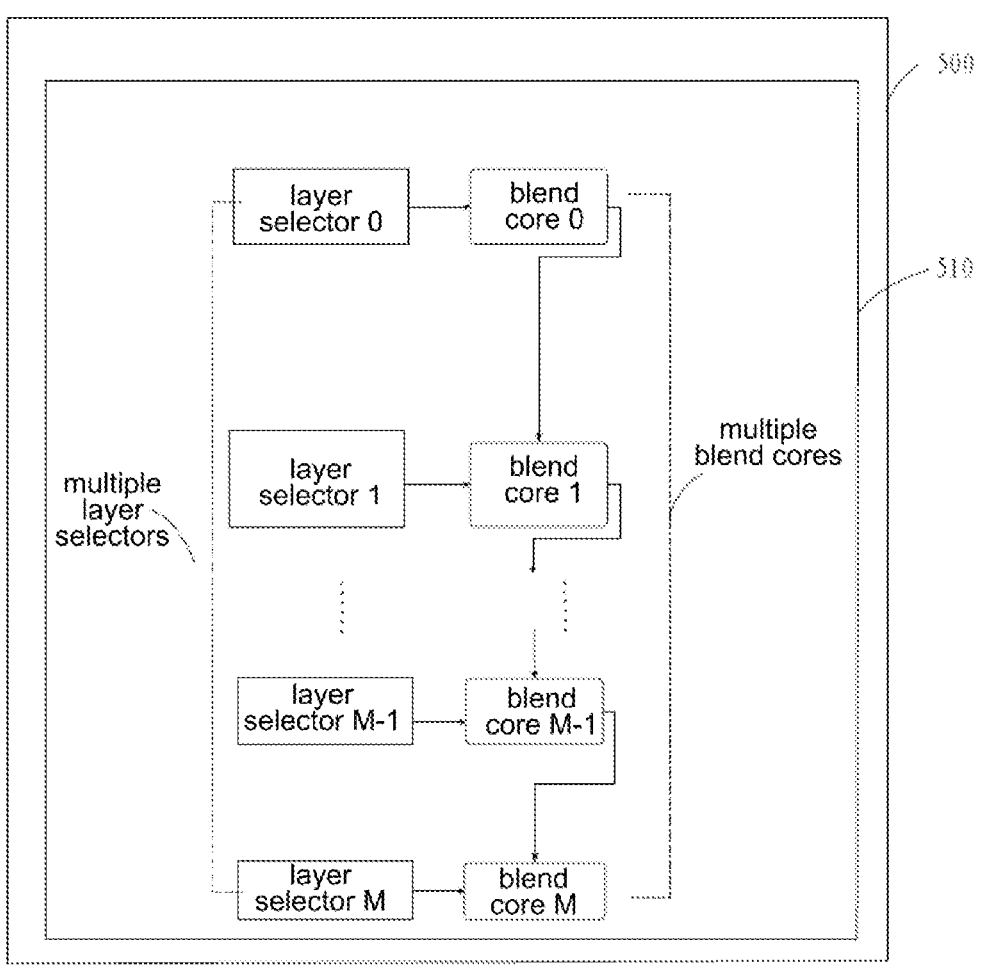
FIG. 5 is the schematic diagram of the display data processor unit provided in one embodiment of the present disclosure.

FIG. 5 provides a schematic diagram of a display processor unit 500 in one embodiment of the present disclosure. The display processor unit comprises multiple layer selectors and multiple blend cores, wherein the multiple layer selectors and multiple blend cores can be configured within the blender 510. As shown in FIG. 5, the display processor unit comprises:

multiple layer selectors, configured for: obtaining a pixel coordinate of a target pixel point; searching for a to-be-blended source layer among multiple source layers, wherein the to-be-blended source layer comprises pixels to be displayed on a display axis, and the display axis is the coordinate axis of the pixel coordinate in the pixel coordinate system; assigning the to-be-blended source layer to different blend cores, wherein the to-be-blended source layers correspond one-to-one with the blend cores; and each blend core, configured for blending the assigned to-be-blended source layer to generate display data.

Multiple layer selectors obtain the coordinates of the target pixel point in the pixel coordinate system, resulting in pixel coordinates. The pixel coordinate system can be adjusted as needed. A target pixel point refers to a pixel that is ready for blending. For example, a blended image is composed of multiple source layers, and a target pixel point can be one pixel point at any position on the blended image. Using the coordinate system of the blended image as the pixel coordinate system, the coordinates of the target pixel point are obtained, for example, (1,1). The source layers refer to images used for blending. The to-be-blended source layer refers to the source layer that comprises pixels to be displayed on a display axis. The display axis is the coordinate axis in the display coordinate system corresponding to the X coordinate or Y coordinate of the display coordinates.

Multiple layer selectors search, among all source layers, the source layer that comprises the pixel points to be displayed on the display axis. Exemplary, for blended images, it comprises source layers 0, 1, and 2, after obtaining the display coordinates (1,1) of the target pixel point, the display axis of the current target pixel point can be obtained. If the row is selected as the display axis, then the 1st row (X=1) is referred to as the display axis. In the aforementioned source layers 0 to 3, for each source layer, whether it comprises pixels to be displayed on the display axis (X=1) is determined. If a source layer comprises pixel points to be displayed on the display axis, it indicates that it is able to participate in the blending of the target pixel point and is selected as the to-be-blended source layer.

A to-be-blended source layer is assigned to a blend core within the display processor unit by the multiple layer selectors. Different to-be-blended source layers are assigned to different blend cores, and one single blend core can only be assigned to one to-be-blended source layer. For example, to-be-blended source layer A is assigned to blend core 0, and to-be-blended source layer C is assigned to blend core 1.

Each blend core blends its assigned to-be-blended source layer, thereby generating the display data.

In the embodiment of the present disclosure, each layer selector corresponds one-to-one with one blend core. The source layers are provided with a predefined first number. Each layer selector is used for: obtaining the source layers one by one according to the order of the first number, and determining whether the obtained source layer is the to-be-blended source layer; generating a second number by numbering the identified to-be-blended source layer in the order of acquisition; searching for an assigned source layer of the layer selector, wherein the assigned source layer is the to-be-blended source layer whose second number is the same as the blend core number corresponding to the layer selector, and the assigned source layer is used to be assigned to the blend core corresponding to each layer selector.

The source layers comprise preset hierarchy, and each source layer comprises a different blend hierarchy, and the hierarchy of the source layer is the first number of the source layer. Each layer selector obtains the coordinates of the target pixel points in the pixel coordinate system, thus obtaining the pixel coordinates.

Each layer selector will sequentially obtain source layers in ascending order of the first number. For each obtained source layer, whether it is a to-be-blended layer for the target pixel is determined, thereby obtaining the to-be-blended source layers of the source layer. For all to-be-blended source layers, the to-be-blended source layers are numbered in the order in which they were obtained. Within the to-be-allocated source layers it has found, the to-be-blended source layer configured for assigning a corresponding blend core to the layer selector, i.e., the assigned source layer, are searched for. The second number of the assigned source layer is identical to the number of the blend core corresponding to the layer selector.

In the embodiment of the present disclosure, each layer selector corresponds one-to-one with one blend core. The source layers are provided with a predefined first number. Each layer selector is configured for performing an iteration, wherein the iteration comprises: obtaining a source layer of the first number identical to a first parameter, and determining whether the obtained source layer is the to-be-blended source layer, wherein an initial value of the first parameter is zero; incrementing, if the obtained source layer is the to-be-blended source layer, the second parameter by one, wherein an initial value of the second parameter is negative one; determining if the second parameter incremented by one is identical to the number of the blend core; if they are identical, taking the second parameter incremented by one as the second number of the obtained source layer and stopping the iteration, wherein the obtained source layer is the assigned source layer for that layer selector, and the assigned source layer is used for allocation to the blend core corresponding to each layer selector; if they are not identical, incrementing the first parameter by one and conducting a new round of iteration.

Each layer selector receives the coordinate y_dest of the current display row of the blend layer, i.e., the row where the target pixel is located, sent from its corresponding blend core.

Each layer selector starts executing the iteration by:

obtaining the current value of the first parameter, and obtaining the source layer with the same number of layer as the value of the first parameter, wherein the obtained source layer is the current-round source layer;

reading the row number y_src[i] of the current pixel in the source layer for the current round; determining whether y_src[i] is equal to y_dest, wherein if they are equal, the obtained source layer is a to-be-blended source layer; obtaining, if the obtained source layer is a to-be-blended source layer, the current value of the second parameter and incrementing it by 1; and determining whether the current second parameter (i.e., the second parameter after +1) is equal to the hierarchy of the blend core; and if the current second parameter is equal to the hierarchy of the blending core, it means the currently obtained source layer is the to-be-blended source layer corresponding to the blend core. In the embodiment of the present disclosure, the iteration further comprises:

incrementing, if the obtained source layer is not the to-be-blended source layer, the current first parameter by one and performing a new round of iteration.

During the iteration, if it is determined that y_src[i] is not equal to y_dest, indicating that the currently obtained source layer is not the to-be-blended source layer corresponding to the blend core, the layer selector can increment the first parameter by 1, and start a new iteration.

In the embodiment of the present disclosure, the iteration further comprises:

determining whether the current first parameter is greater than a maximum value of the first number; and if the current first parameter is greater than the maximum value of the first number, terminating the iteration.

During the iteration, after incrementing the first parameter by one, the layer selector determines whether the current first parameter is less than or equal to the maximum value of the first number (hierarchy of the source layer). If the first parameter is greater than the maximum value of the first number, it indicates that the layer selector has already performed the judgment of the to-be-blended source layers for all source layers. Thereby, the iteration can be ended. Conversely, if the first parameter is less than or equal to the maximum value of the first number, then there exists a source layer that can perform the judgment of the to-be-blended source layer, and the iteration should be continued.

In the embodiment of the present disclosure, the number of the blend cores represents the hierarchy of the blend cores:

a top-level blend core is used for blending the assigned to-be-blended source layer with a predefined background color; and other blend cores are used for blending the assigned to-be-blended source layer with blending data output by the blend core of the previous level, wherein the other blend cores are any blend core except the top-level blend core, and the display data are the blending data output by the blend core of the last level.

The top-level blend core of the multiple blend cores will select the configured background color as the target pixel data. In its corresponding to-be-blended layer, the pixel corresponding to the position of the target pixel is obtained as the source pixel, and the source pixel and the target pixel data are blended to obtain the blending data of the top-level blend core.

For each blend core in the multiple blend cores except for the top-level blend core, the target pixel data thereof is the blending data output by the blend core of the previous level, and the source pixel thereof is the pixel corresponding to the position of the target pixel in the to-be-blended layer corresponding thereto. The source pixel and the target pixel data are blended to obtain the blending data of the layer of the blend core.

Through the level-by-level blending by the blend core, the to-be-blended source layers will be blended layer by layer, so that the blending data output from the last layer of the blend core is the blending data of the target pixels.

In the embodiments provided in the present disclosure, it should be understood that the systems, devices, and methods disclosed, can be implemented in other ways. The above-described embodiments of the device are merely schematic, for example, the division of the units described, which is only a logical functional division, can be divided in another way when actually implemented; also, for example, multiple units or components can be combined or can be integrated into another system, or some features can be ignored, or not implemented. On another point, the mutual coupling, direct coupling, or communication connection shown or discussed herein can be an indirect coupling or communication connection through communication interfaces, devices, or units, which can be electrical, mechanical, or other forms.

In addition, the units illustrated as separate components can/cannot be physically separated, and the components displayed as units can/cannot be physical units, i.e., they can be located in one place or distributed to a plurality of network units. Some or all of these units can be selected according to actual needs to achieve the objective of the embodiment solution.

Further, each functional module in each embodiment of the present disclosure can be integrated together to form a separate part, or each module may exist separately, or two or more modules may be integrated to form a separate part.

It should be noted that functionality can be stored in a computer-readable storage medium if implemented as a software function module and sold or used as a standalone product. It is understood that the technical solution of the present disclosure, or that part of the technical solution that essentially contributes to the prior art, may be embodied in the form of a software product stored in a storage medium comprising several instructions to cause a computer device (which may be a personal computer, a server, or a network device, etc.) to perform all or some of the steps of the method described in various embodiments of the present disclosure. All or some of the steps of the method are described in various embodiments of the present disclosure. The aforementioned storage media comprises various media that can store program code, such as various media that can store program code, such as USB flash drives, mobile hard drives, Read-Only Memory (ROM), Random Access Memory (RAM), disks, or CD-ROMs.

In the context, relationship terms such as first and second are used only to distinguish one entity or operation from another, without necessarily requiring or implying any such actual relationship or order between those entities or operations.

The above is only an embodiment of the present disclosure, which is not intended to limit the scope of protection of the present disclosure, and the present disclosure can have various changes and variations for those skilled in the art. Any modification, equivalent substitution, improvement, etc. made within the spirit and principles of the present disclosure shall be included in the scope of protection of the present disclosure.

What is claimed is:

1. A method for processing display data, wherein the method is applied to a display processor unit, and the display processor unit comprises multiple blend cores; the method comprises:

obtaining a pixel coordinate of a target pixel point;

searching for a to-be-blended source layer among multiple source layers, wherein the to-be-blended source layer comprises pixels to be displayed on a display axis, and the display axis is a coordinate axis of the pixel coordinate in a pixel coordinate system; and assigning the to-be-blended source layer to different blend cores, wherein the to-be-blended source layer corresponds one-to-one with the blend cores, wherein each of the blend cores blends an assigned to-be-blended source layer to generate display data, wherein the display processor unit further comprises multiple layer selectors, and each layer selector corresponds one-to-one with one blend core, wherein the source layers are provided with a predefined first number, and wherein the step of searching for a to-be-blended source layer among multiple source layers comprises performing an iteration by each layer selector, wherein the iteration comprises:

obtaining a source layer of the first number identical to a first parameter, and determining whether an obtained source layer is the to-be-blended source layer, wherein an initial value of the first parameter is zero;

incrementing, when the obtained source layer is the to-be-blended source layer, a second parameter by one, wherein an initial value of the second parameter is negative one;

determining whether the second parameter incremented by one is identical to a number of the blend core;

when the second parameter incremented by one is determined to be identical to the number of the blend core, taking the second parameter incremented by one as the second number of the obtained source layer and stopping the iteration, wherein the obtained source layer is the assigned source layer for the layer selector, and the assigned source layer is used for allocation to a blend core corresponding to each layer selector; and when the second parameter incremented by one is determined to not be identical to the number of the blend core, incrementing the first parameter by one and conducting a new round of the iteration.

2. The method according to claim 1, wherein the display processor unit further comprises multiple layer selectors, and each layer selector corresponds one-to-one with one blend core; the source layers are provided with a predefined first number; and the step of searching for a to-be-blended source layer among multiple source layers comprises that:

each of the layer selectors obtains the source layers one by one according to an order of the first number, and determines whether obtained source layers are the to-be-blended source layer;

each of the layer selectors renumbers the to-be-blended source layer based on an order of acquisition of the to-be-blended source layer, and a second number is generated; and each of the layer selectors searches for an assigned source layer of the layer selector, wherein the assigned source layer is the to-be-blended source layer whose second number is the same as a blend core number corresponding to the layer selector, and the assigned source layer is used to be assigned to a blend core corresponding to each layer selector.

3. The method according to claim 2, wherein a number of the blend cores represents a hierarchy of the blend cores; and the step of each blend core performs blending the assigned to-be-blended source layer to generate display data comprises:

blending, through a top-level blend core, the assigned to-be-blended source layer with a predefined background color; and blending, through other blend cores, the assigned to-be-blended source layer with blending data output by a blend core of a previous level, wherein the other blend cores are any blend core except the top-level blend core, and the display data are blending data output by a blend core of a last level.

4. The method according to claim 1, wherein the method further comprises:

incrementing, when the obtained source layer is not the to-be-blended source layer, a current first parameter by one and performing a new round of the iteration.

5. The method according to claim 4, wherein a number of the blend cores represents a hierarchy of the blend cores; and the step of each blend core performs blending the assigned to-be-blended source layer to generate display data comprises:

blending, through a top-level blend core, the assigned to-be-blended source layer with a predefined background color; and blending, through other blend cores, the assigned to-be-blended source layer with blending data output by a blend core of a previous level, wherein the other blend cores are any blend core except the top-level blend core, and the display data are blending data output by a blend core of a last level.

6. The method according to claim 1, wherein the method further comprises:

determining whether a current first parameter is greater than a maximum value of the first number; and terminating the iteration, when the current first parameter is greater than the maximum value of the first number.

7. The method according to claim 6, wherein a number of the blend cores represents a hierarchy of the blend cores; and the step of each blend core performs blending the assigned to-be-blended source layer to generate display data comprises:

blending, through a top-level blend core, the assigned to-be-blended source layer with a predefined background color; and blending, through other blend cores, the assigned to-be-blended source layer with blending data output by a blend core of a previous level, wherein the other blend cores are any blend core except the top-level blend core, and the display data are blending data output by a blend core of a last level.

8. The method according to claim 1, wherein a number of the blend cores represents a hierarchy of the blend cores; and the step of each blend core performs blending the assigned to-be-blended source layer to generate display data comprises:

blending, through a top-level blend core, the assigned to-be-blended source layer with a predefined background color; and blending, through other blend cores, the assigned to-be-blended source layer with blending data output by a blend core of a previous level, wherein the other blend cores are any blend core except the top-level blend core, and the display data are blending data output by a blend core of a last level.

9. The method according to claim 1, wherein a number of the blend cores represents a hierarchy of the blend cores; and the step of each blend core performs blending the assigned to-be-blended source layer to generate display data comprises:

blending, through a top-level blend core, the assigned to-be-blended source layer with a predefined background color; and blending, through other blend cores, the assigned to-be-blended source layer with blending data output by a blend core of a previous level, wherein the other blend cores are any blend core except the top-level blend core, and the display data are blending data output by a blend core of a last level.

10. A display processor unit, wherein the display processor unit comprises multiple layer selectors and multiple blend cores, wherein the multiple layer selectors are configured for:

obtaining a pixel coordinate of a target pixel point;

searching for a to-be-blended source layer among multiple source layers, wherein the to-be-blended source layer comprises pixels to be displayed on a display axis, and the display axis is a coordinate axis of the pixel coordinate in a pixel coordinate system; and assigning the to-be-blended source layer to different blend cores, wherein the to-be-blended source layer corresponds one-to-one with the blend cores;

wherein each blend core is configured for blending an assigned to-be-blended source layer to generate display data;

wherein each layer selector corresponds one-to-one with one blend core;

wherein the source layers are provided with a predefined first number; and wherein each layer selector is configured for performing an iteration, wherein the iteration comprises:

obtaining a source layer of a first number identical to a first parameter, and determining whether an obtained source layer is the to-be-blended source layer, wherein an initial value of the first parameter is zero;

incrementing, when the obtained source layer is the to-be-blended source layer, a second parameter by one, wherein an initial value of the second parameter is negative one;

determining whether the second parameter incremented by one is identical to a number of the blend core;

when the second parameter incremented by one is determined to be identical to the number of the blend core, taking the second parameter incremented by one as the second number of the obtained source layer and stopping the iteration, wherein the obtained source layer is the assigned source layer for the layer selector, and the assigned source layer is used for allocation to a blend core corresponding to each layer selector; and when the second parameter incremented by one is determined to not be identical to the number of the blend core, incrementing the first parameter by one and conducting a new round of the iteration.

11. The display processor unit according to claim 10, wherein each layer selector corresponds one-to-one with one blend core; the source layers are provided with a predefined first number; and each of the layer selectors is configured for: obtaining the source layers one by one in an order of the first number, determining whether an obtained source layer is the to-be-blended source layer, renumbering the to-be-blended source layer based on an order of acquisition of the to-be-blended source layer, and then generating a second number; and searching for an assigned source layer of the layer selector, wherein the assigned source layer is the to-be-blended source layer whose second number is the same as a blend core number corresponding to the layer selector, and the assigned source layer is used to be assigned to a blend core corresponding to each layer selector.

12. The display processor unit according to claim 11, wherein the number of the blend cores represents a hierarchy of the blend cores;

a top-level blend core is used for blending the assigned to-be-blended source layer with a predefined background color; and other blend cores are used for blending the assigned to-be-blended source layer with blending data output by a blend core of a previous level, wherein the other blend cores are any blend core except the top-level blend core, and the display data are blending data output by a blend core of a last level.

13. The display processor unit according to claim 10, wherein the iteration further comprises:

incrementing, when the obtained source layer is not the to-be-blended source layer, a current first parameter by one and performing a new round of the iteration.

14. The display processor unit according to claim 13, wherein the number of the blend cores represents a hierarchy of the blend cores;

a top-level blend core is used for blending the assigned to-be-blended source layer with a predefined background color; and other blend cores are used for blending the assigned to-be-blended source layer with blending data output by a blend core of a previous level, wherein the other blend cores are any blend core except the top-level blend core, and the display data are blending data output by a blend core of a last level.

15. The display processor unit according to claim 10, wherein the iteration further comprises:

determining whether a current first parameter is greater than a maximum value of the first number; and terminating the iteration when the current first parameter is greater than the maximum value of the first number.

16. The display processor unit according to claim 10, wherein the number of the blend cores represents a hierarchy of the blend cores;

a top-level blend core is used for blending the assigned to-be-blended source layer with a predefined background color; and other blend cores are used for blending the assigned to-be-blended source layer with blending data output by a blend core of a previous level, wherein the other blend cores are any blend core except the top-level blend core, and the display data are blending data output by a blend core of a last level.

17. The display processor unit according to claim 10, wherein the number of the blend cores represents a hierarchy of the blend cores;

a top-level blend core is used for blending the assigned to-be-blended source layer with a predefined background color; and other blend cores are used for blending the assigned to-be-blended source layer with blending data output by a blend core of a previous level, wherein the other blend cores are any blend core except the top-level blend core, and the display data are blending data output by a blend core of a last level.

18. An electronic device, wherein the electronic device comprises the display processor unit according to claim 10.

* * * * *